United States Patent [19]
Weber et al.

[11] Patent Number: 6,094,909
[45] Date of Patent: Aug. 1, 2000

[54] SECONDARY AIR SYSTEM FOR AN INTERNAL COMBUSTION ENGINE

[75] Inventors: Olaf Weber, Leonberg; Holger Paffrath, Ludwigsburg, both of Germany

[73] Assignee: Filterwerk Mann & Hummel GmbH, Ludwigsburg, Germany

[21] Appl. No.: 09/202,836

[22] PCT Filed: Apr. 3, 1997

[86] PCT No.: PCT/EP97/01665

§ 371 Date: Dec. 15, 1998

§ 102(e) Date: Dec. 15, 1998

[87] PCT Pub. No.: WO97/38212

PCT Pub. Date: Oct. 16, 1997

[30] Foreign Application Priority Data

Apr. 4, 1996 [DE] Germany .......................... 196 13 780
Jul. 19, 1996 [DE] Germany .......................... 196 29 127

[51] Int. Cl.[7] .................................................. F01N 5/04
[52] U.S. Cl. .................. 60/280; 60/289; 60/307; 60/397
[58] Field of Search .............................. 60/280, 307, 289, 60/290, 291, 292, 397, 287

[56] References Cited

U.S. PATENT DOCUMENTS

| | | | |
|---|---|---|---|
| 3,299,629 | 1/1967 | Bouchard | 60/30 |
| 4,146,986 | 4/1979 | Kohama et al. | 60/290 |
| 4,463,554 | 8/1984 | Südbeck et al. | 60/274 |
| 4,534,173 | 8/1985 | Tsukamoto | 60/606 |
| 4,674,283 | 6/1987 | Ishida et al. | 60/606 |
| 5,400,597 | 3/1995 | Mirabile | 60/606 |

*Primary Examiner*—Thomas Denion
*Assistant Examiner*—Binh Tran
*Attorney, Agent, or Firm*—Evenson, McKeown, Edwards & Lenahan, P.L.L.C.

[57] ABSTRACT

A secondary air system for an internal combustion engine (32), including at least one line (14) through which air is blown into the exhaust pipe of the engine, a pump (26) and a drive (27) for the pump (26). In addition an air-feed line (13) is provided through which the secondary air is supplied to the pump (26). The power necessary to drive the pump is provided by the engine (32).

16 Claims, 13 Drawing Sheets

SECONDARY AIR SYSTEM FOR AN INTERNAL COMBUSTION ENGINE

BACKGROUND OF THE INVENTION

The invention relates to a secondary air system for an internal combustion engine. It is known that to improve the oxidation of hydrocarbons and carbon monoxides so-called secondary air, that is, additional air, can be blown into the exhaust gas end of the internal combustion engine.

German Patent Application DE-A-42 19267 describes a system for blowing secondary air for internal combustion engines in which a compressor is driven by an air-flow machine acting as a motor. The air-flow machine is connected parallel to a duct section with a throttle, the duct section being disposed upstream from a throttle connection to increase the power. The aspirated air is guided by a switch valve either through the throttle or through the air-flow machine.

A disadvantage of the known system is that the aspirated air fed to the motor is reduced by the additional throttle. Also, an additional element exists in the aspirated air train which has to be regulated according to the load on the motor.

It is also known to use a diaphragm pump for the injection of secondary air into internal combustion engines. A disadvantage of this system is the need to provide a pressure reservoir, which thus makes the system less economical.

SUMMARY OF THE INVENTION

The invention is addressed to the problem of improving the known systems.

This problem is solved, setting out from the preamble of the independent claim 1, by its distinctive characteristics.

The important advantage of the invention is that an additional throttle system is not needed for driving a turbine. Instead, unused energy, already present, is used for driving the turbine.

In one embodiment of the invention it is proposed to use as the drive means a turbine powered by the aspirated air. The pressure drop between the pressure of the aspirated air of the internal combustion engine ahead of the throttle valve and the pressure of the intake air following the throttle valve is used such that the turbine is disposed in a bypass line which is arranged to extend around the throttle valve. This turbine directly drives a pump for the secondary air. In an alternative embodiment of the invention the secondary air can also be produced by an electric motor serving as a pump.

Another embodiment of the invention envisions using filtered intake air for the secondary air injection. This has the advantage of reducing the degree of contamination of the drive for the secondary air.

In accordance with one advantageous embodiment of the invention it is proposed to provide an apparatus for preparing the secondary air. This is, for example, an additional filter element which is designed for the requirements of the pump. The clean air for driving the turbine of the secondary air charger cools very greatly upon expansion in the turbine. Consequently, water can condense out of the intake air or possibly freeze.

To prevent an accumulation of moisture, in a further embodiment of the invention it is proposed to install a water separator, as for example a baffle plate or a nonwoven web, on the low-pressure side of the turbine in the line carrying the expanded air to the plenum. It is also possible to provide an ice separator in the form of a baffle plate or a nonwoven web on the low-pressure side of the turbine.

In an additional embodiment of the invention it is proposed to mount the secondary air charger with the engine's air intake tube to form a single unit. Alternatively, it is also possible to integrate the secondary air charger with the throttle valve connection in a single module. Other variants are the integration of the secondary air charger into the clean air duct, in the air filter housing or in the cylinder head cover of the engine.

It is also possible, of course, to assemble the secondary air charger with some other selected component into one unit or configure it as a module.

In another embodiment of the invention it is proposed to regulate both the engine power and the secondary air charger power by the mass air flow fed to the secondary air charger. An alternative embodiment envisions subdividing the flow cross section for the mass air flow into individual cross sections that can be turned on and off in order to regulate the motor power or the secondary air charger power. The turbine can be made advantageously by the synthetic resin injection molding assembly technique. This means that all the parts or a great number of the parts are produced successively in a single tool by injection molding. Of course, it is also possible to produce the turbine housing, for example, of a metal material and to produce the preferably adjustable guide vanes as well as the adjusting mechanism by injection molding from synthetic resin. It is also conceivable to manufacture the turbine by the lost-wax process.

These and other features of preferred embodiments of the invention will be found not only in the claims but also in the description and the drawings, it being possible for the individual features to be realized individually or together in the form of sub-combinations in the embodiment of the invention and in other fields, and may represent advantageous as well as independently patentable embodiments for which protection is hereby claimed.

BRIEF DESCRIPTION OF THE DRAWINGS

The invention will be explained in further detail hereinafter with reference to illustrative embodiments.

DETAILED DESCRIPTION OF PREFERRED EMBODIMENTS

Figure 1:
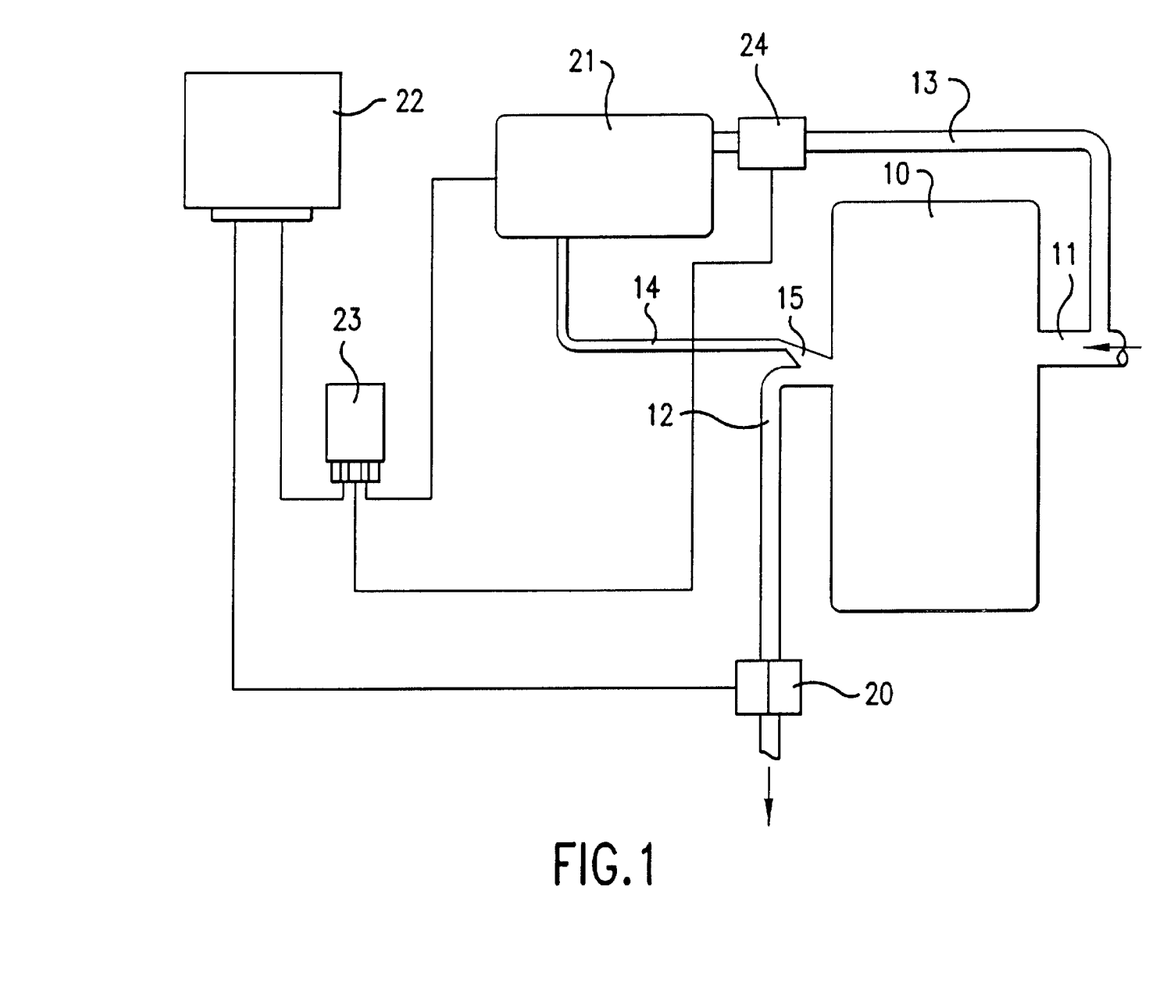
FIG. 1 shows a system for secondary air injection.

The secondary air charging system according to FIG. 1 shows a schematically represented internal combustion engine 10 on which on the clean air side an intake tube 11 is provided, through which the cleaned air is supplied to the internal combustion engine. At the discharge end a exhaust elbow 12 is provided with lambda probes 20. An electrical secondary air pump 21 is also provided. This air pump is controlled by means of an electronic control apparatus 22 and a relay 23. The electrical secondary air pump is fed clean air through the duct 13 and a switch valve 24. This clean air is compressed and fed through duct 14 to the injection point 15. There this clean air is mixed with the exhaust gas and thus produces increased oxidation of the hydrocarbons.

Figure 2:
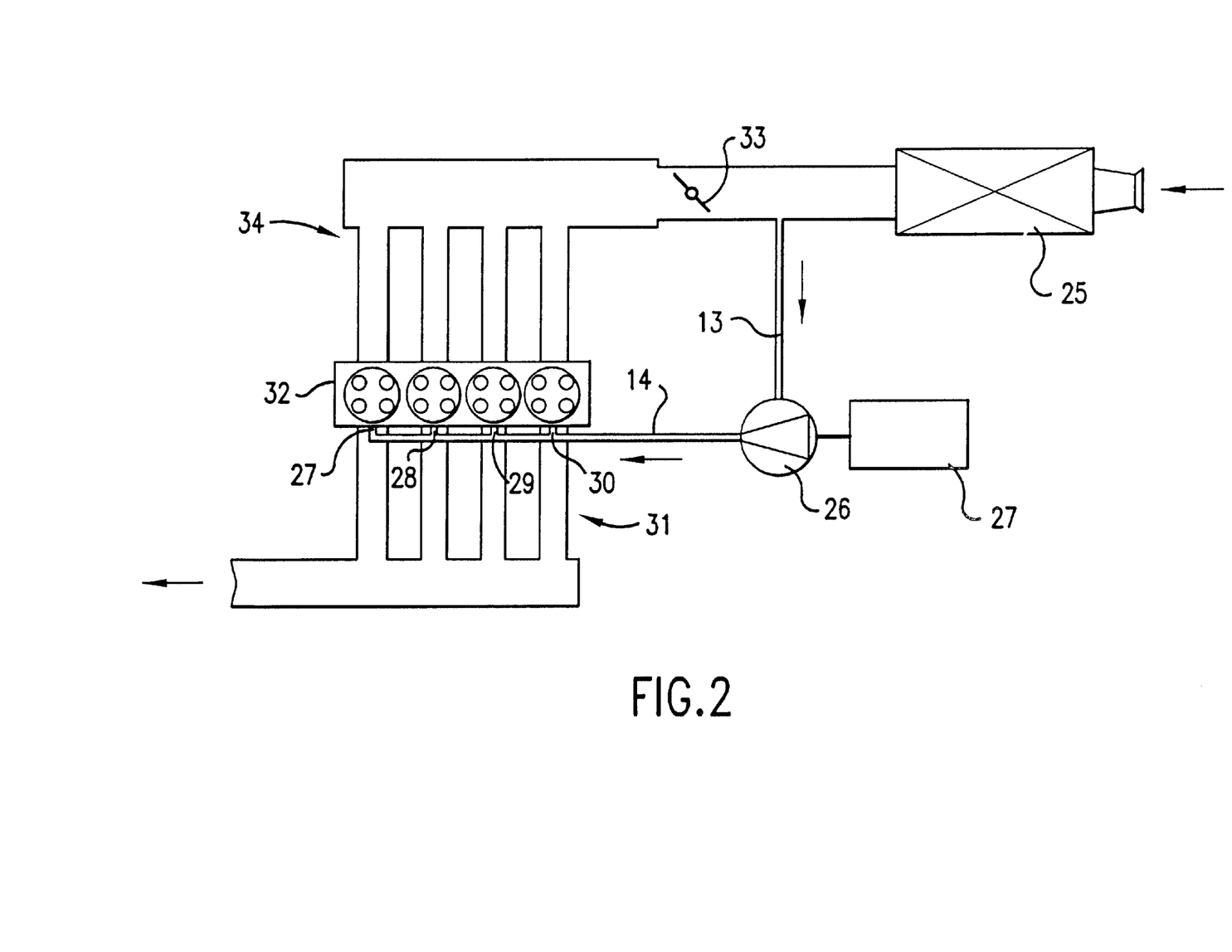
FIG. 2 shows a schematic diagram of a secondary air system with an electrical secondary air pump.

FIG. 2 shows a schematic representation with an electrical secondary air pump. As can be seen therefrom, the clean air is branched off through duct 13 behind the air filter 25 for the intake air, fed to the pump 26 which is driven by the electric motor 27, and pumped from there through duct 14 to the corresponding injection points 27, 28, 29, 30 on the exhaust side 31 of the internal combustion engine 32. The air intake assembly of the internal combustion engine 32 comprises the air filter 25, a throttle valve 33, as well as an air intake duct system 34.

Figure 3:
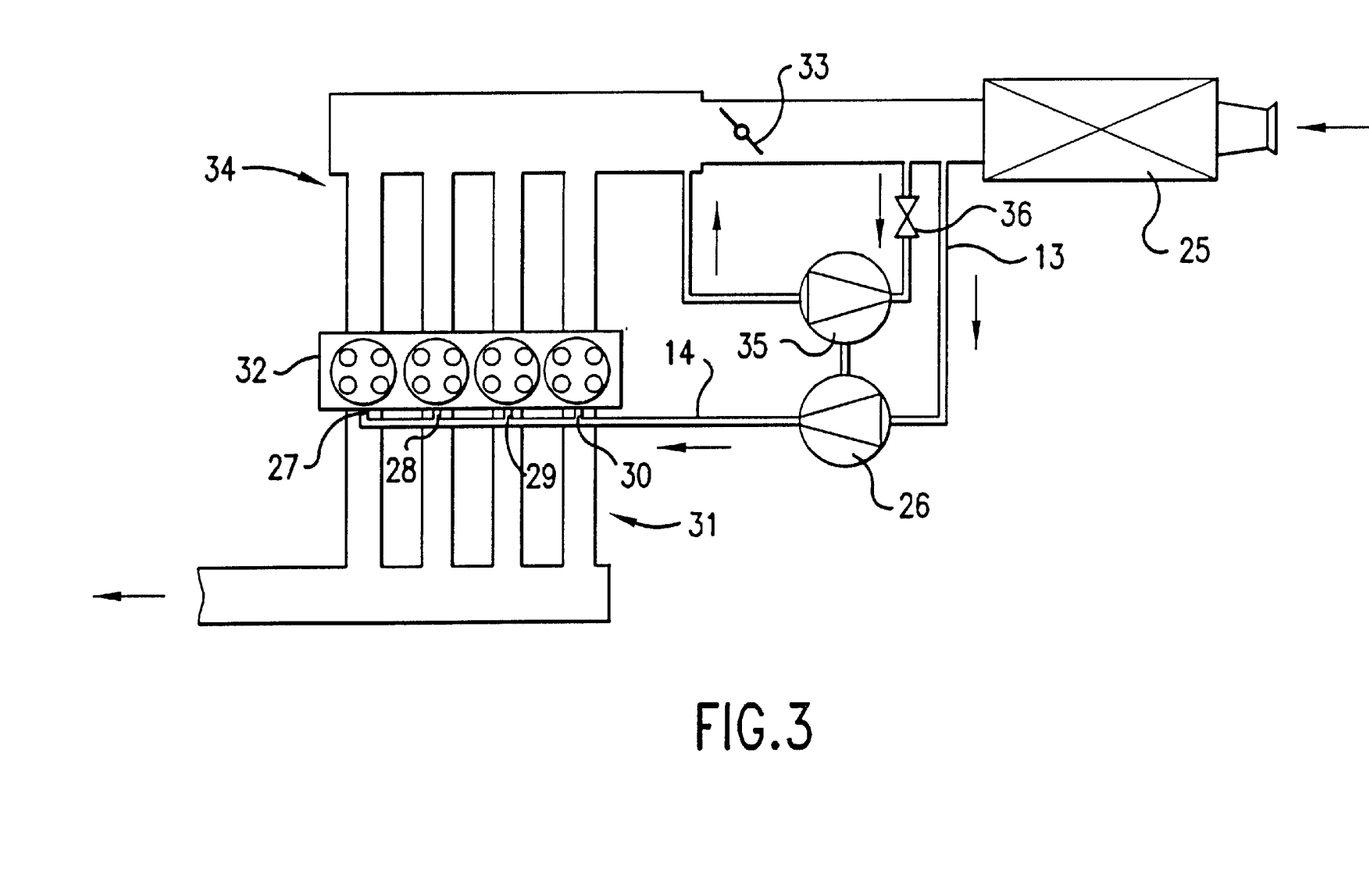
FIG. 3 shows a schematic diagram of a secondary air system with secondary air charger.

FIG. 3 shows a variant of a secondary air system with a secondary air charger. The parts taken from FIG. 2 are provided with the same reference numerals. Here too the clean air is supplied through duct 13 to the pump or the compressor 26. The compressor 26 is [driven] by a turbine 35, the turbine is fed with aspirated air, the pressure difference between the pressure ahead of the throttle valve 33 and the air intake vacuum behind the throttle valve being utilized.

A safety valve 36 or a cut-off valve can, of course, be integrated into the system for supplying air to the turbine 35. Also possible here is an electrical operation of the valves in order to shut off the supply of secondary air under certain operating conditions of the engine.

It is also possible to drive the turbine with liquid, such as water or oil. For this purpose it is appropriate to use the water circulation system or the oil circulation system of the internal combustion engine.

Figure 4:
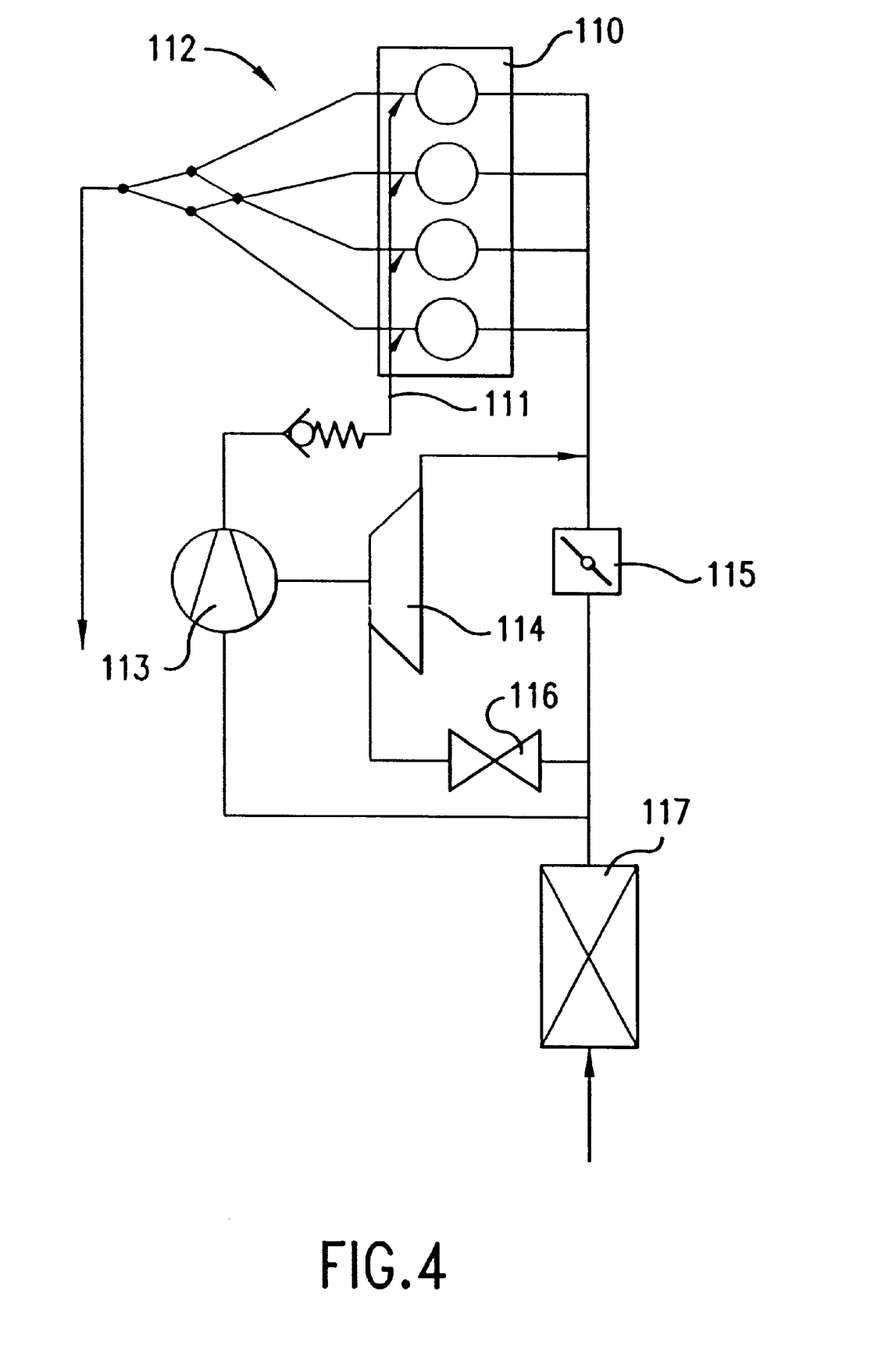
FIGS. 4–11 show schematic representations of a secondary air system in a number of different variations.

The schematic diagram of FIG. 4 shows the feeding of secondary air to an internal combustion engine 110. The secondary air is fed through the duct 111 to the exhaust pipes 112. The secondary air is produced by means of a compressor 113 which is driven by a turbine 114. This turbine utilizes the mass flow of fresh air supplied to the internal combustion engine 110. For this purpose a bypass through a valve 116 to a throttle point 115 is provided. The energy of the flow of the air flowing through the bypass drives the turbine 114 and with it the pump 113. The air supplied to the internal combustion engine is cleaned by means of a filter system 117.

Figure 5:
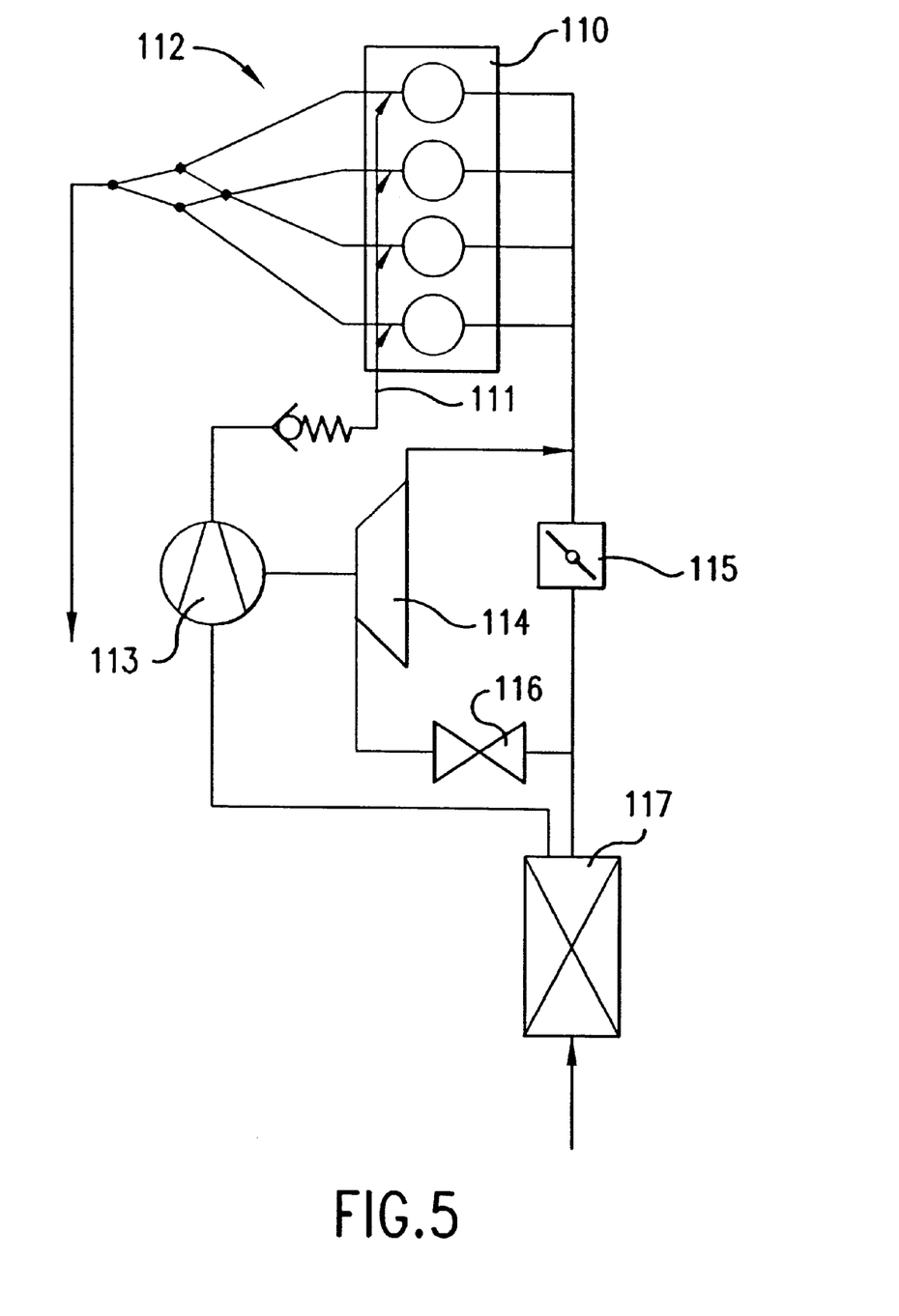

While in FIG. 4 the secondary air is taken from the clean air stream, FIG. 5 shows the secondary air taken directly from the air filter 117. The symbols correspond to those of FIG. 4.

The rest of the construction shown in FIG. 5 is identical with the construction of FIG. 4.

Figure 6:
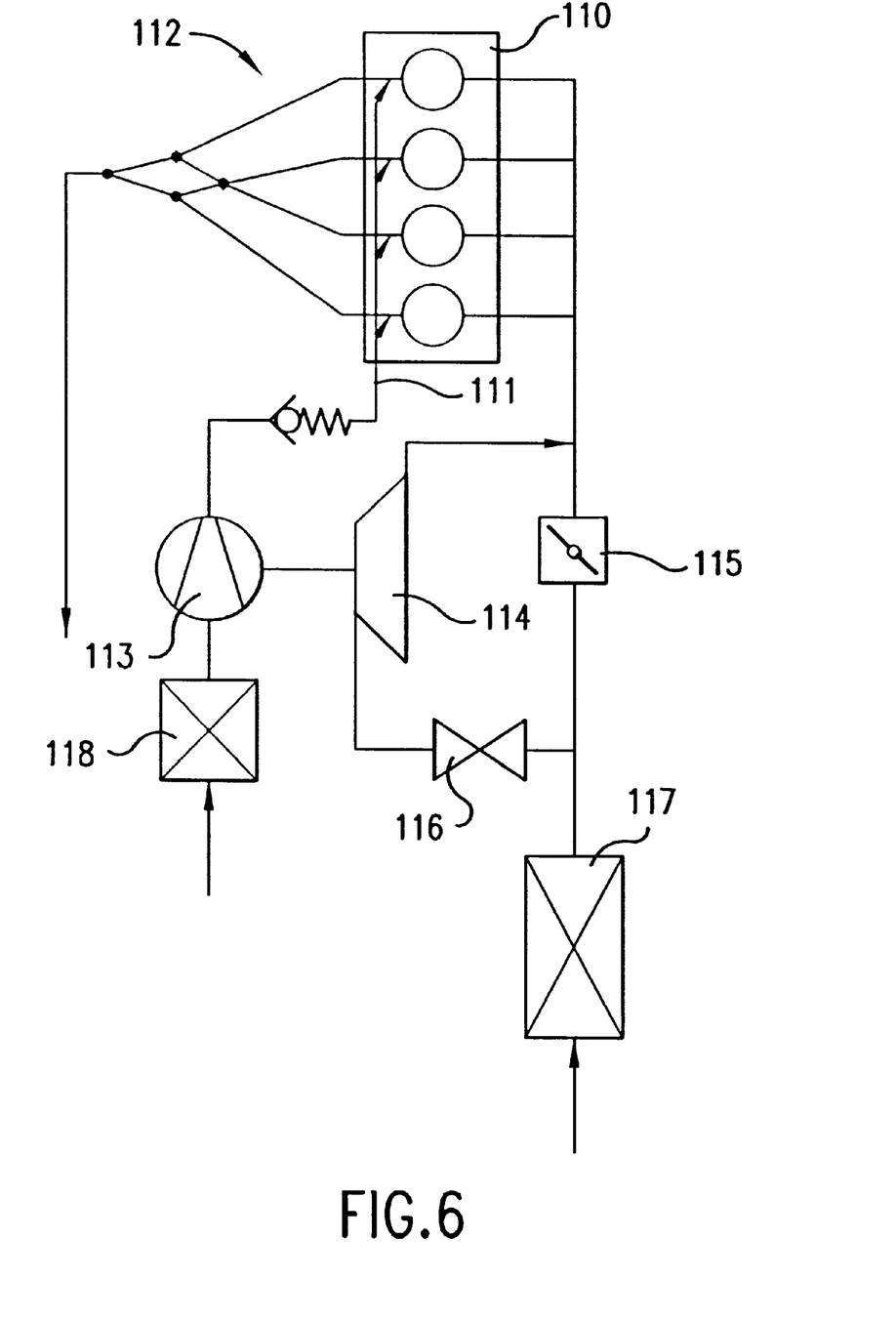

FIG. 6 shows the secondary air being fed through an additional filter element 118. This has the advantage that a filter designed for the needs of the pump and of the secondary air feed can be used.

Figure 7:
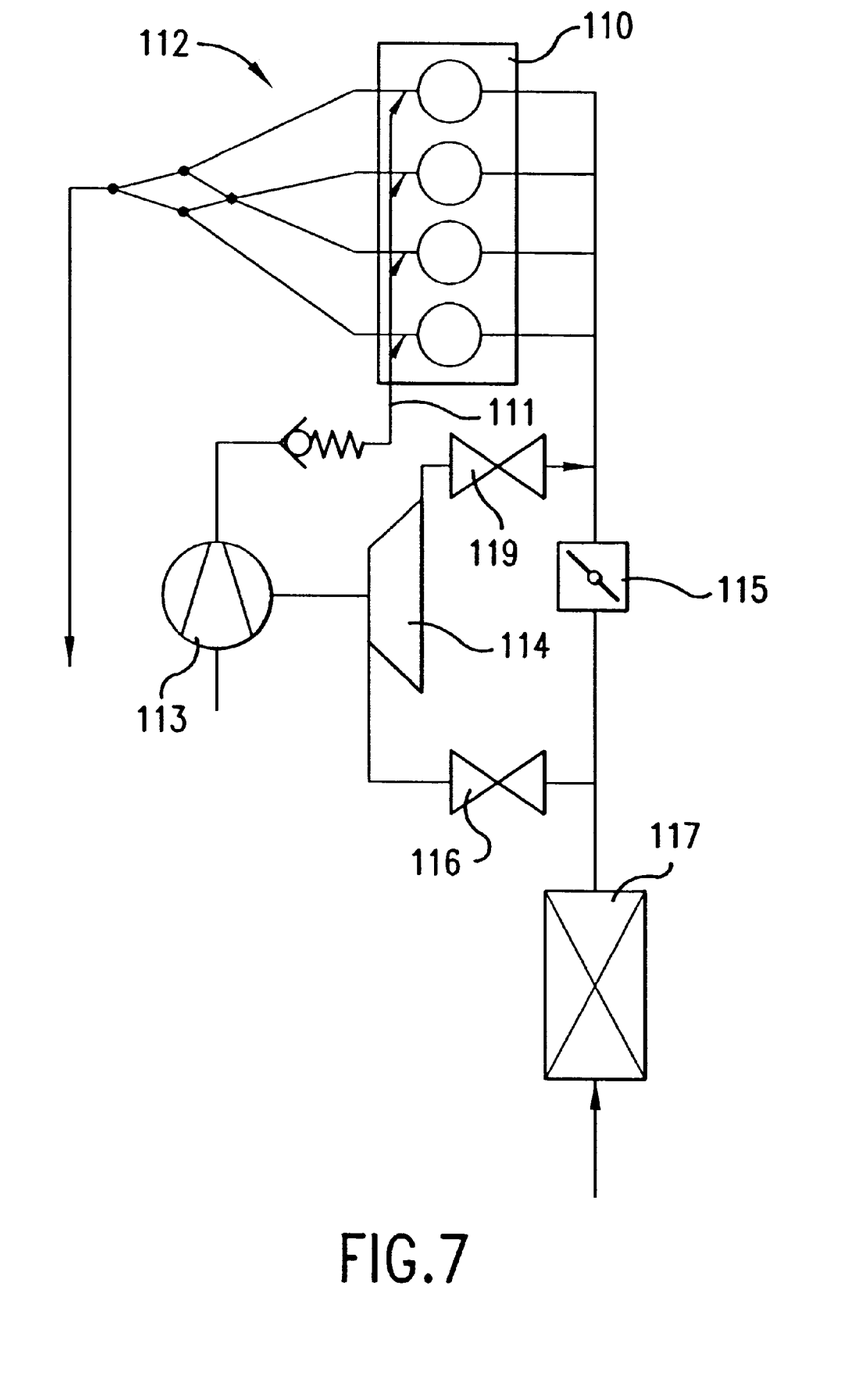

In another variant according to FIG. 7, it is proposed that both the motor power and the secondary air charger power be controlled through the mass air flow fed to the secondary air charger. For that purpose, as shown in FIG. 7, a valve 116 is provided ahead of the secondary air charger (turbine 114). Likewise it is possible to arrange a valve 119 at the discharge of the turbine 114.

When the valves, or one valve, is in the open state, the control of the power of the internal combustion engine is accomplished by the throttle 115. The power of the secondary air charger or turbine 114 is established as a consequence of the mass flow distribution. A cut-off means in the inlet line to the turbine, i.e., the valve 116 or valve 119, can also assume intermediate positions and therefore can be used for regulation or control.

Figure 8:
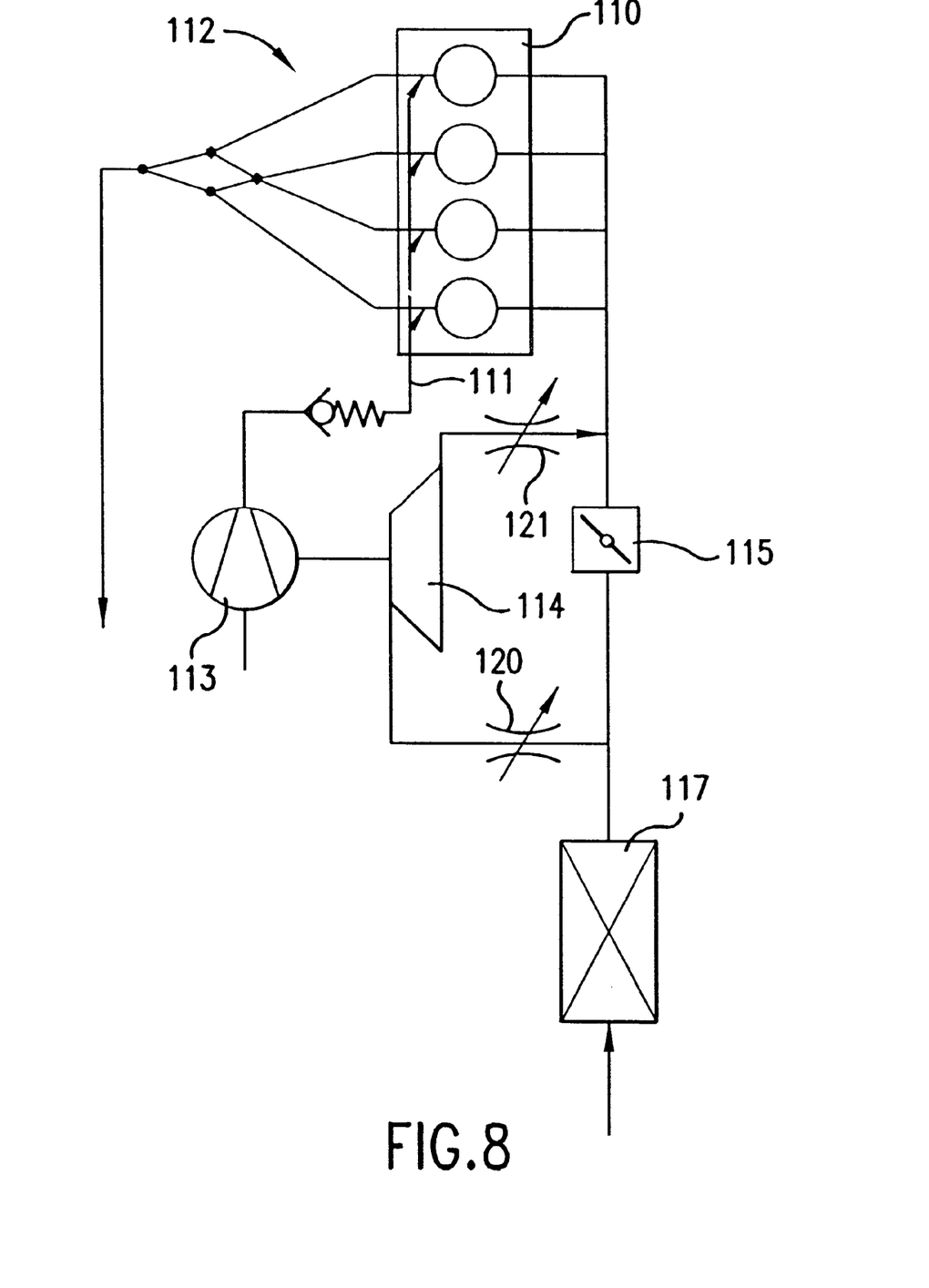

FIG. 8 shows throttle locations 120 and 121 which vary the cross section of the respective duct. Just one single throttle is also, of course, sufficient. This can be disposed either on the high-pressure side or on the low-pressure side of the turbine 114. The regulation of the engine power and secondary air charger power is accomplished by the interaction of the two throttle systems, i.e., the throttle 115 and the throttles 120 or 121.

Another possibility for the regulation of the engine power and secondary air charger power is for the cross section of the mass flow of turbine 114 to be adjusted in step-wise fashion by a register switching matrix of individual cross sections.

Figure 9:
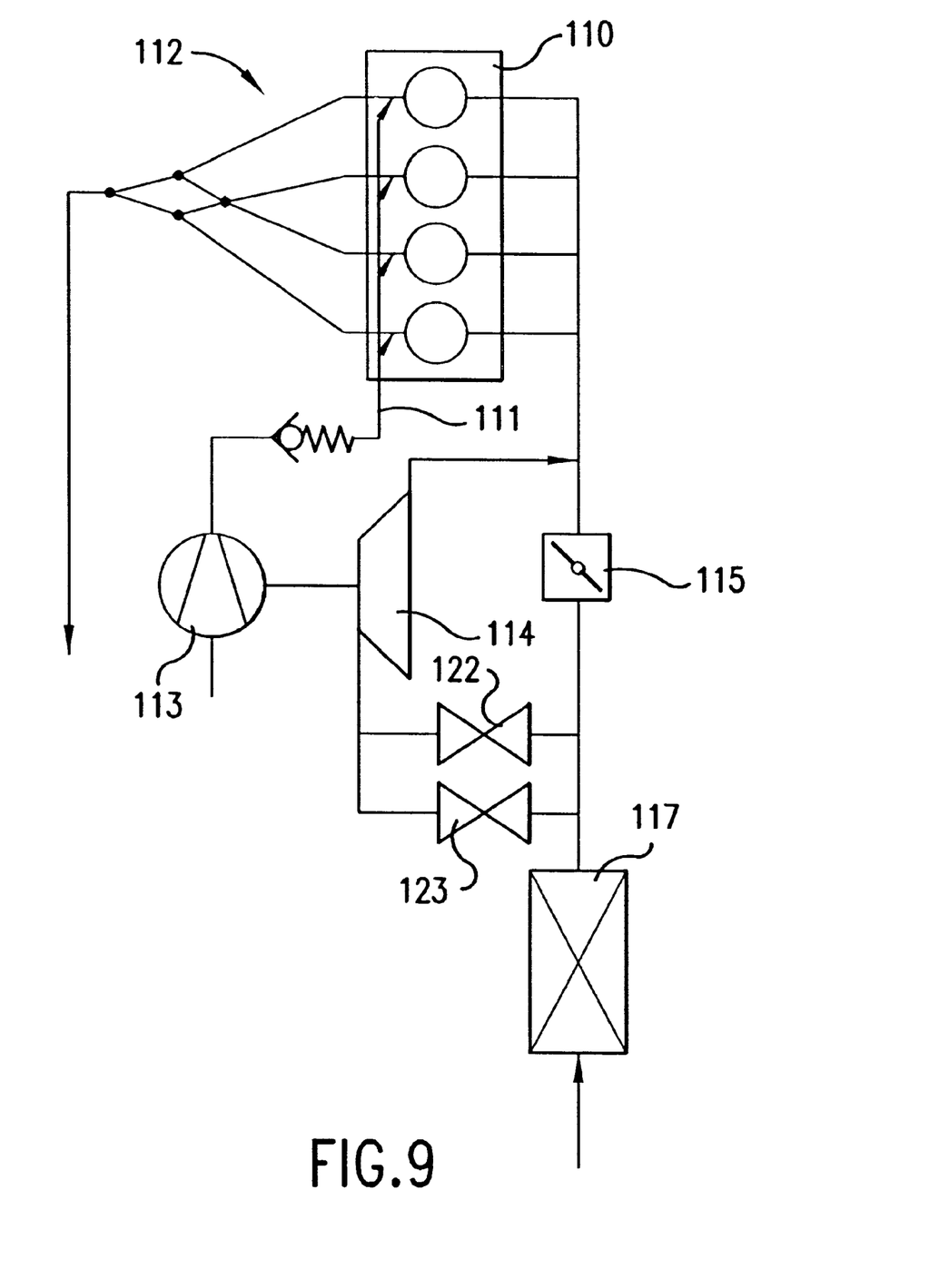
Figure 10:
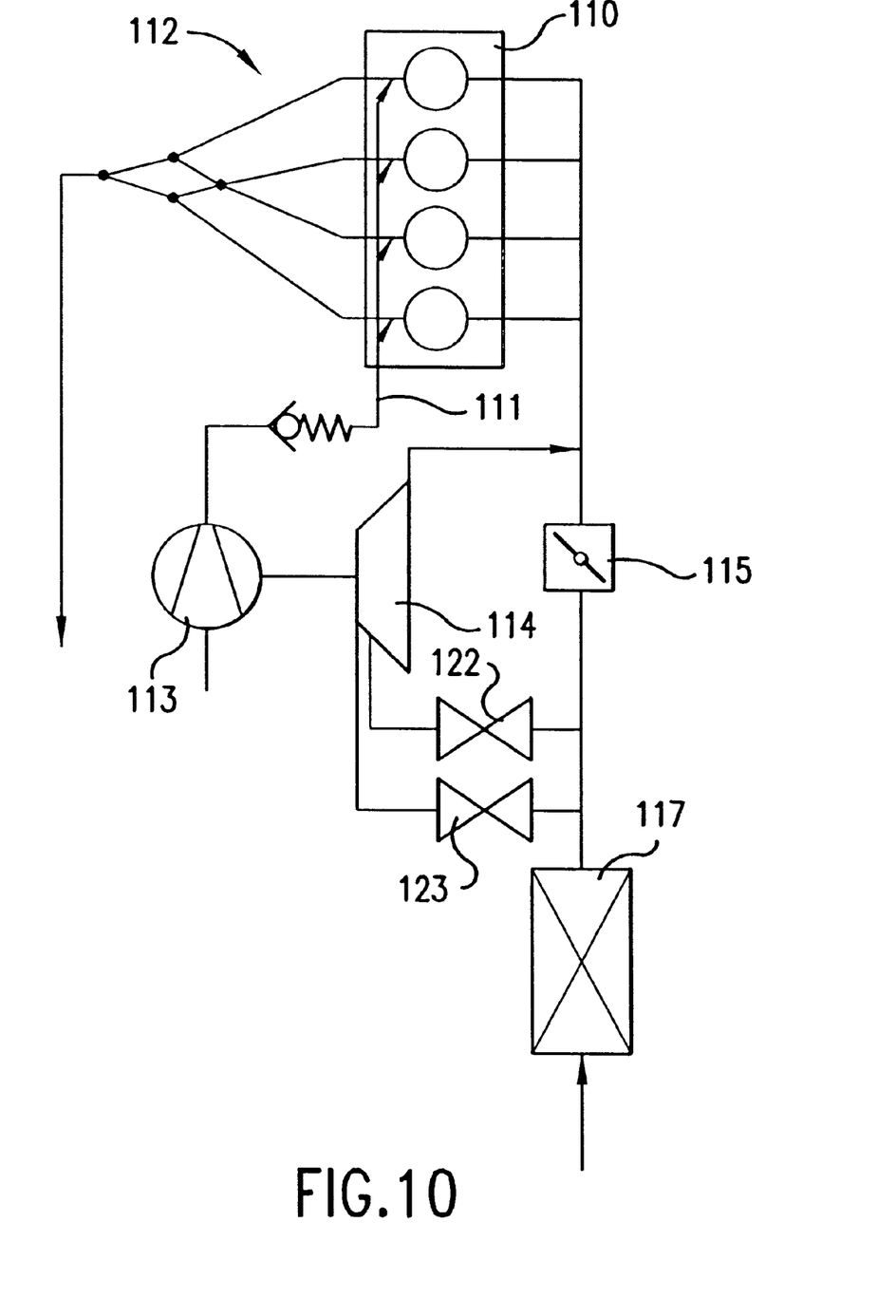

According to FIG. 10, a parallel arrangement of two ducts is possible. Both of the two ducts are each provided with a respective valve 122 and 123. Whereas in FIG. 9 the two lines are brought together ahead of the turbine, it is also possible as indicated in FIG. 10 to bring the two ducts directly to the turbine 114 and thus feed this turbine with the appropriate mass air flow at different points.

Figure 11:
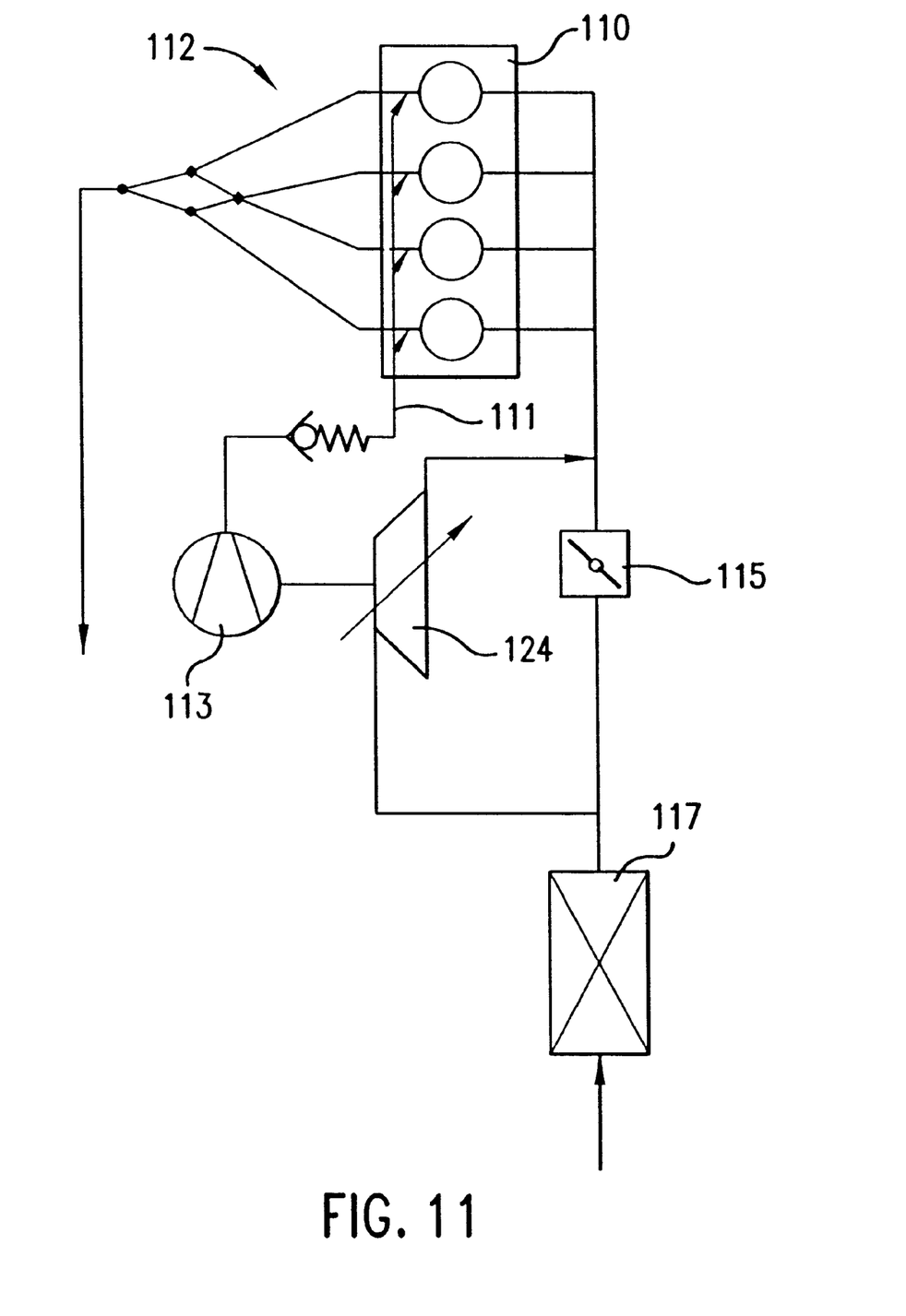
Figure 12:
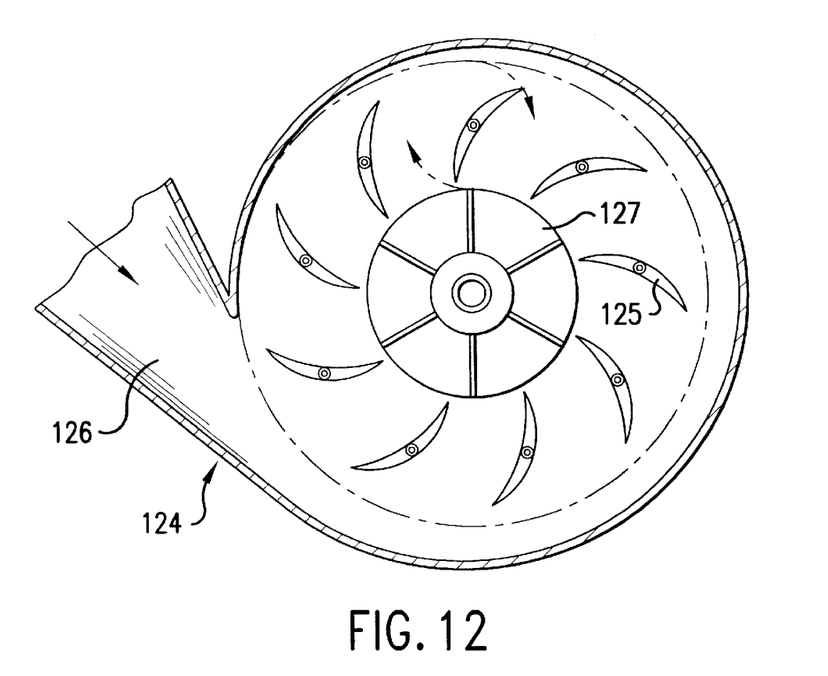
FIG. 12 shows a view of a turbine with adjustable guide vanes.

FIG. 11 shows a controllable turbine 124 in a schematic representation. Such a turbine has, for example, as shown in FIG. 12,a turbine geometry with adjustable guide vanes 125. This turbine has a specific inlet cross section 126 as well as the turbine wheel 127. The speed of rotation of the turbine wheel 127 can be varied depending on the setting of the guide vanes 125.

Figure 13:
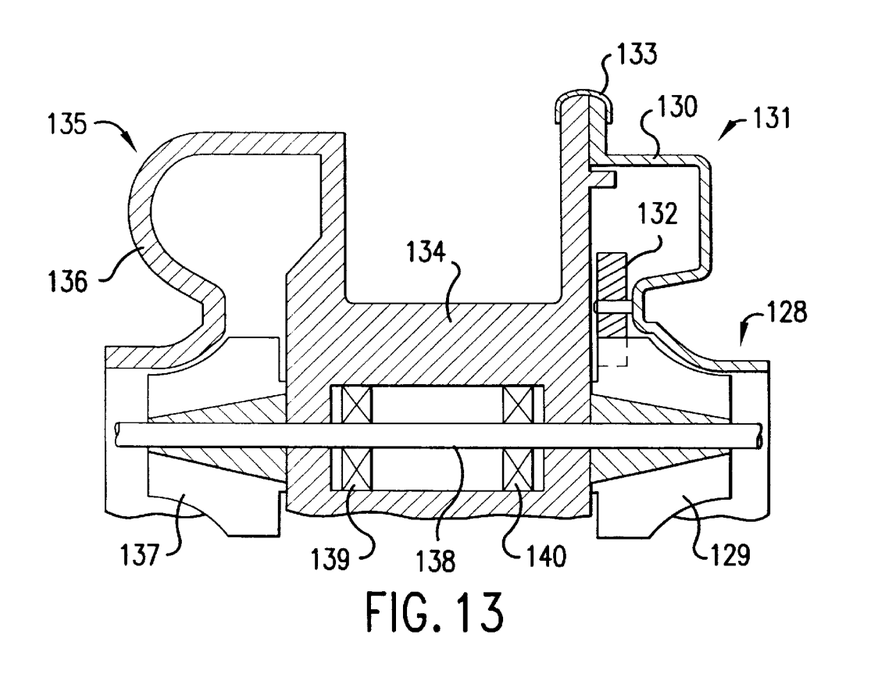
FIG. 13 shows a cross sectional view of a turbine.

FIG. 13 shows a simple construction of a turbine 128 with a turbine wheel 129 and a turbine housing 130 with a coupled pump 131. The turbine, which is arranged on the right side, has guide vanes 132 which are produced, for example, by the injection molding assembly method. The housing 130 of the turbine is joined by a clamping band 133 to a centrally arranged supporting part 134. The pump 135 is arranged on the left side, with the pump cover 136 and the supporting part 134 being made in one piece.

The turbine wheel 29 and the pump wheel 137 are fastened onto a common shaft 138; the shaft is positioned in the supporting part 134 by the bearings 139 and 140.

Figure 14:
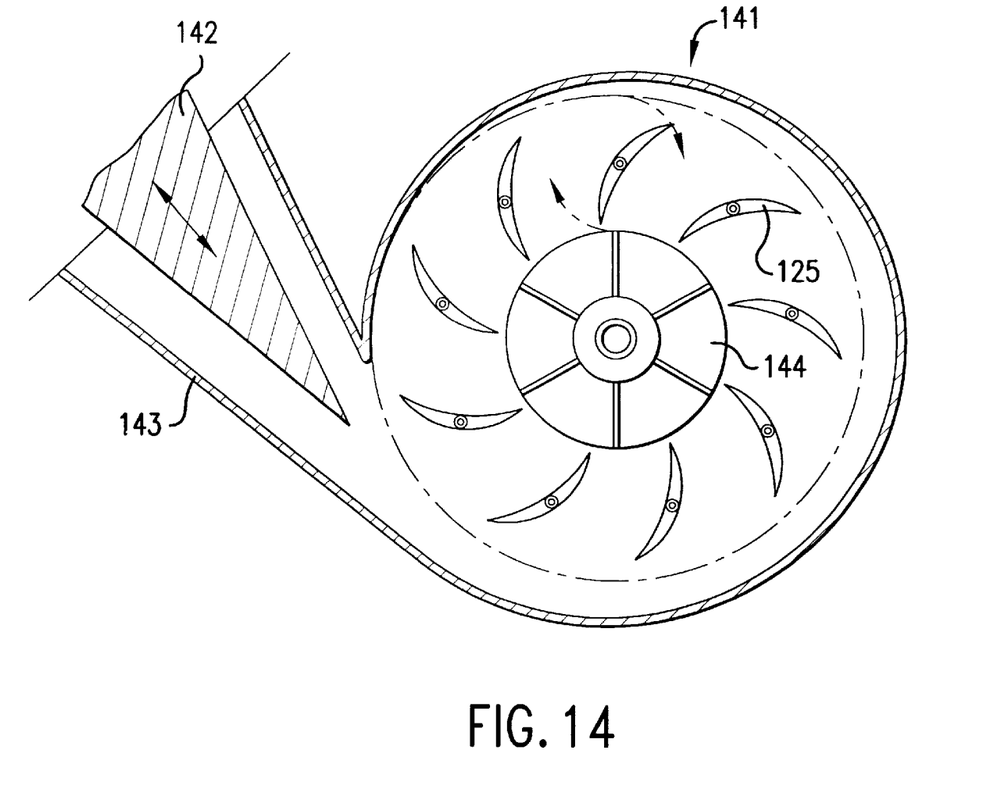
FIG. 14 shows a turbine with a variable inlet cross section.

FIG. 14 shows an inlet cross section 143 for a turbine 141, which can be varied by an axially displaceable cone 142. The purpose of such an axially displaceable cone 142 is to avoid any throttling. The increased kinetic energy in the narrowed cross section is to be sustained as much as possible so it can be used in the turbine wheel 144. The contour of the housing and the geometry of the cone are formed such that, in the event of a narrowing of the flow cross section by a displacement of the taper 142, no abrupt cross-sectional changes will take place. The cone 142 can, of course, also be used to shut off the air flow and thus shut off the secondary air charger.

What is claimed is:

1. A secondary air system for an internal combustion engine which draws intake air through an intake duct and a throttle valve, said secondary air system comprising at least one line for blowing secondary air into an exhaust pipe of the internal combustion engine, a pump, a drive for the pump, and a supply line for supplying the secondary air to the pump, wherein the drive for the pump is a turbine powered by the pressure drop between the pressure of the intake air drawn in by the internal combustion engine and the pressure of the intake air following the throttle valve.

2. A secondary air system according to claim 1, wherein the drive is a turbine driven by the intake air.

3. A secondary air system according to claim 2, further comprising a cut-off valve for shutting off intake air to the turbine.

4. A secondary air system according to claim 2, wherein air flows to said turbine through at least two parallel lines which can be individually regulated.

5. A secondary air system according to claim 1, wherein the drive is a turbine driven by a fluid selected from the group consisting of oil and water circulated by the engine.

6. A secondary air system according to claim 1, wherein the drive for the pump is an electric motor.

7. A secondary air system according to claim 1, wherein filtered clean air is supplied to the supply line for the secondary air.

8. A secondary air system according to claim 1, further comprising an air filter for filtering the secondary air.

9. A secondary air system according to claim 1, further comprising a liquid separator arranged upstream of the turbine.

10. A secondary air system according to claim 1, wherein the pump and the turbine are constructed as part of a modular assembly which forms a single unit with at least one further device selected from the group consisting of an engine air intake duct, a throttle valve support, a clean air duct, an air filter housing, and a cylinder head cover of the internal combustion engine.

11. A secondary air system according to claim 1, wherein power of the engine is at least partially regulated by regulating the flow through said secondary air system.

12. A secondary air system according to claim 1, wherein operation of the turbine is controlled by an adjusting means adjacent the turbine which forms a variable turbine entry cross section.

13. A secondary air system according to claim 1, wherein operation of the turbine is controlled by varying the turbine geometry.

14. A secondary air system according to claim 13, wherein the turbine geometry is varied by adjustable guide vanes in the turbine.

15. A secondary air system according to claim 1, wherein operation of the turbine is controlled by a cone arranged in an inlet of the turbine so as to be axially displaceable in order to vary the cross sectional area of the turbine inlet.

16. A secondary air system according to claim 1, further comprising a moisture separator arranged upstream of the turbine.

* * * * *